A. J. THOMPSON.
VEHICLE WHEEL HUB.
APPLICATION FILED JULY 29, 1915.
1,269,131. Patented June 11, 1918.
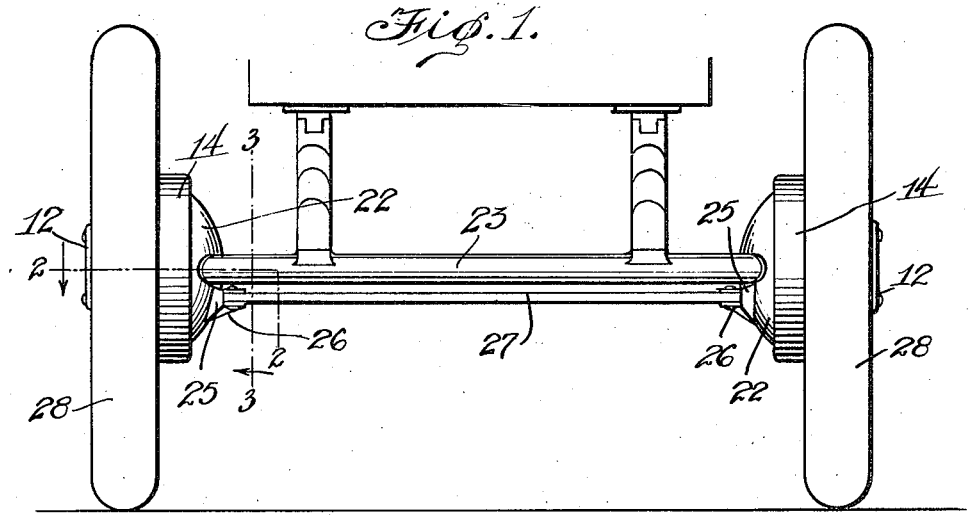
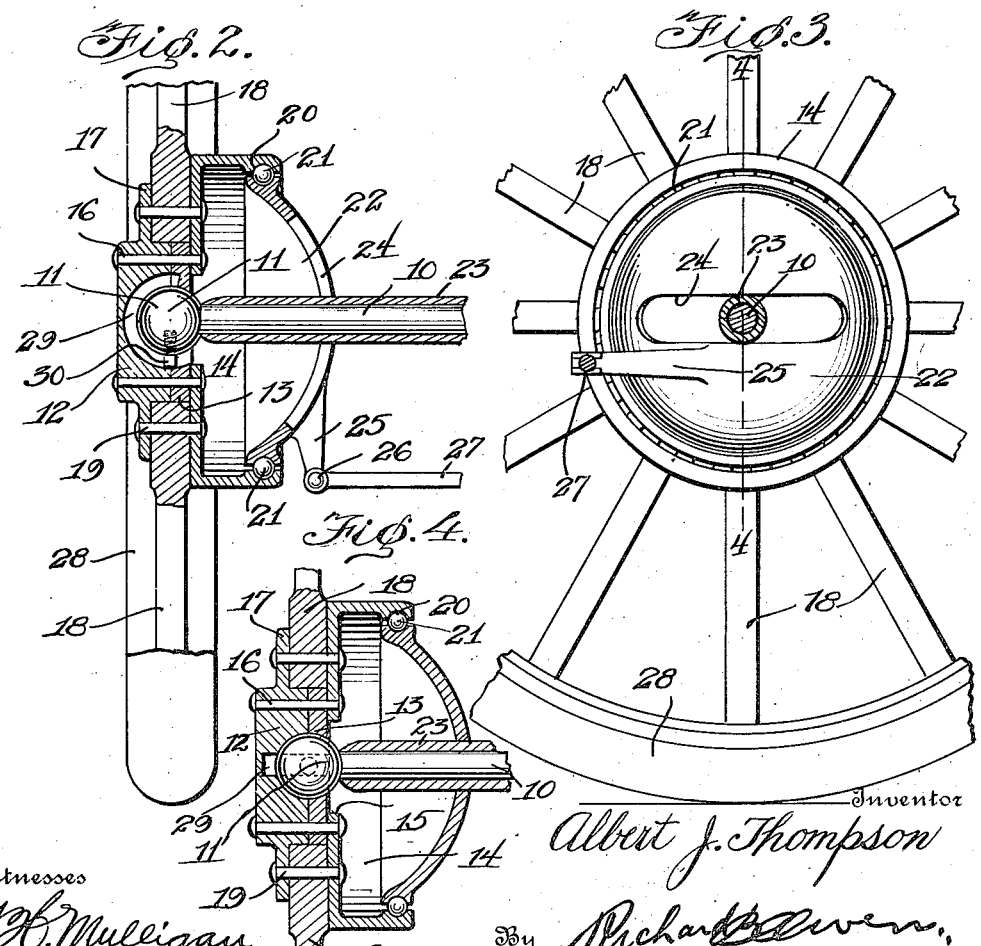
Witnesses
Inventor
Albert J. Thompson
By Richard B. Owen
Attorney

UNITED STATES PATENT OFFICE.

ALBERT J. THOMPSON, OF DUNN CENTER, NORTH DAKOTA.

VEHICLE-WHEEL HUB.

1,269,131.  Specification of Letters Patent.  Patented June 11, 1918.

Application filed July 29, 1915. Serial No. 42,605.

*To all whom it may concern:*

Be it known that I, ALBERT J. THOMPSON, a citizen of the United States, residing at Dunn Center, in the county of Dunn and State of North Dakota, have invented certain new and useful Improvements in Vehicle-Wheel Hubs, of which the following is a specification.

This invention relates to a hub for vehicle wheels and is particularly applicable for the wheels of automobiles.

As a principal object, it is contemplated by this invention to provide a vehicle hub which shall be shaped to accommodate therein the extremity of an axle, the latter being formed with a bearing ball and hence offering but slight resistance to turning when the vehicle is rounding a curve.

A still further object is to provide a vehicle hub and wheel mounting of such simple substantial qualities as to render it applicable for use upon cars furnished with four-wheel drive and with four-wheel steering mechanism.

The above and additional objects which will become apparent as this explanatory description proceeds, are accomplished by such means as are illustrated in the accompanying drawings and described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts.

Figure 1 is a front elevation of a vehicle equipped with the hub of this invention, Figs. 2 and 3 are sectional views taken on the respective planes indicated by the lines 2—2 and 3—3 of Fig. 1, and Fig. 4 is a sectional view at right angles to Fig. 2 and taken upon the line 4—4 of Fig. 3.

In the embodiment of this invention illustrated, the axle denoted 10 is formed at each extremity with a bearing 11 which is preferably in the shape of a sphere and which is receivable in part within a suitable recess formed in the hub boxing 12 and which is prevented from displacement by the hub plate 13. A casing 14 which may be utilized to contain the customary brake lining is centrally apertured as denoted by the numeral 15 to permit the passage therethrough of the axle with its ball extremity and is secured to the hub by means 16 which pass through the boxing, the plate 13 and the flange of this casing.

A flange 17 is formed upon the boxing 12 to provide, in connection with the outer side of casing 14 a channeled way for the reception of the spokes 18 of the vehicle wheel, which are secured in place by bolts 19 or a similar fastening means. Inwardly the casing 14 is provided with a channeled edge 20 which serves as a ball race for the anti-frictional bearings 21 which are positioned therebetween and the hub cap 22, this latter being substantially hemi-spherical and bearing upon the sheathing 23 of the axle 10. The cap is formed with a slot 24 permitting angular variation in a horizontal plane between the axle and the hub.

Forwardly this hub cap 22 may be formed with a lug or projection 25 to which may be pivoted by the means designated 26 the control rod 27 of the steering mechanism. In order to insure that rotation of the axle 10 will drive the wheel denoted 28 as a whole there is provided a semicircular recess 29 formed to partially surround the bearing ball 11 and being adapted to receive the lower head of a threaded pin or the like 30 which is secured to the ball 11 at right angles to the axle 10. If this right angular relationship between the stud 30 and the axle is preserved the latter will be permitted pivotal movement with respect to the hub without destroying the driving connections therebetween.

From the foregoing, it will be apparent that driving of the axle 10 within its casing 23 will be transmitted through the bearing ball and its lug 30 to the hub boxing of the wheel 28. The points of support for this wheel are provided by the antifriction means 21 and by the large bearing ball itself, such supporting points being so spaced as to provide ideal conditions of wheel suspension. Manipulation of the usual steering gear in such manner as to force the rods 27 laterally of the vehicle in either direction will impart through the hub cap and casing 14 a similar movement to the wheel 28 so that the vehicle may be readily steered without effecting the drive of the axle 10.

The foregoing is a construction which is readily capable of attaining the previously presented objects and which should be interpreted in the light of the herewith appended claims.

What is claimed is:—

1. In a device of the character described, a boxing formed with a substantially hemispherical bearing recess in one side and an external annular flange, a cylindrical casing having an inwardly directed flange on one side secured to said boxing and forming a channel-way with said boxing flange, spokes receivable in said channel-way, a non-rotatable cap for the inner end of said casing, anti-friction bearings between said cap and casing, a steering arm projecting from said cap, an axle passing freely through a horizontal slot in the cap, a ball formed on each extremity of said axle receivable in said hemi-spherical boxing recess, retainer means for said ball extremity, a semi-circular groove in said boxing opening into said hemi-spherical bearing recess, and means on said ball movable in the groove in the boxing for rotating said hub upon rotation of said axle and also permitting angular displacement of said hub on the axle.

2. In a device of the character described, a hub including a recessed boxing, an annular flange formed on said boxing, a cylindrical casing having an inwardly directed annular flange on one side secured to said boxing and forming with the boxing a flanged channeled way, spokes receivable within said way, a substantially hemi-spherical cap closing the ends of said casing opposite the flange, anti-friction bearings between the casing and the cap, an axle formed with a bearing ball on its outer extremity adapted to be seated in the recess in said boxing, means for supporting said ball in its seat, and means projecting from said ball engaging a curved slot in the boxing for driving said hub when the axle is rotated permitting angular variation of said hub.

In testimony whereof I affix my signature in presence of two witnesses.

ALBERT J. THOMPSON.

Witnesses:
 THOS. G. AHERN,
 M. T. ANTONY.